United States Patent
Liao

(10) Patent No.: US 10,948,769 B1
(45) Date of Patent: Mar. 16, 2021

(54) IMAGE DISPLAY AND BACKLIGHT MODULE THEREOF

(71) Applicant: ASTI GLOBAL INC., TAIWAN, Taichung (TW)

(72) Inventor: Chien-Shou Liao, New Taipei (TW)

(73) Assignee: ASTI GLOBAL INC., TAIWAN, Taichung (TW)

( * ) Notice: Subject to any disclaimer, the term of this patent is extended or adjusted under 35 U.S.C. 154(b) by 0 days.

(21) Appl. No.: 17/007,123

(22) Filed: Aug. 31, 2020

(30) Foreign Application Priority Data

Dec. 12, 2019 (TW) .................................. 108145486

(51) Int. Cl.
*G02F 1/13357* (2006.01)
(52) U.S. Cl.
CPC .............................. *G02F 1/133602* (2013.01)
(58) Field of Classification Search
CPC ......... G02F 1/133602; G02F 1/133603; G02F 1/133609; G02F 1/133611; G02F 2001/133613
See application file for complete search history.

(56) References Cited

U.S. PATENT DOCUMENTS

| 7,651,234 B2 * | 1/2010 | Lim | .................. | G02F 1/133603 362/97.3 |
| 2010/0053496 A1 * | 3/2010 | Park | .................. | G02F 1/133603 349/61 |

* cited by examiner

*Primary Examiner* — Karabi Guharay
(74) *Attorney, Agent, or Firm* — Li & Cai Intellectual Property (USA) Office

(57) ABSTRACT

An image display and a backlight module thereof are provided. The image display includes a display module and the backlight module disposed under the display module. The backlight module includes a direct-type light-emitting unit and a side-type light-emitting unit. The direct-type light-emitting unit includes a first direct-type light-emitting group and a second direct-type light-emitting group. The side-type light-emitting unit includes a plurality of side-type light-emitting elements for surrounding the direct-type light-emitting unit. The first direct-type light-emitting group includes a plurality of first direct-type light-emitting elements, and the second direct-type light-emitting group includes a plurality of second direct-type light-emitting elements for surrounding the first direct-type light-emitting group.

10 Claims, 2 Drawing Sheets

IMAGE DISPLAY AND BACKLIGHT MODULE THEREOF

CROSS-REFERENCE TO RELATED PATENT APPLICATION

This application claims the benefit of priority to Taiwan Patent Application No. 108145486, filed on Dec. 12, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an image display and a backlight module thereof, and more particularly to an image display using a plurality of direct-type light-emitting elements and a plurality of side-type light-emitting elements, and a backlight module thereof.

BACKGROUND OF THE DISCLOSURE

Currently, a TFT-LCD (thin film transistor liquid crystal display) needs to be used together with a light source provided by a backlight module to display images, but the conventional backlight module still has room for improvement.

SUMMARY OF THE DISCLOSURE

In response to the above-referenced technical inadequacies, the present disclosure provides an image display and a backlight module thereof.

In one aspect, the present disclosure provides a backlight module, including a circuit substrate, a direct-type light-emitting unit and a side-type light-emitting unit. The direct-type light-emitting unit includes a first direct-type light-emitting group disposed on the circuit substrate and a second direct-type light-emitting group disposed on the circuit substrate. The side-type light-emitting unit includes a plurality of side-type light-emitting elements disposed on the circuit substrate for surrounding the direct-type light-emitting unit. The first direct-type light-emitting group includes a plurality of first direct-type light-emitting elements arranged as a matrix, and the second direct-type light-emitting group includes a plurality of second direct-type light-emitting elements for surrounding the first direct-type light-emitting group.

In another aspect, the present disclosure provides a backlight module, including a direct-type light-emitting unit and a side-type light-emitting unit. The direct-type light-emitting unit includes a first direct-type light-emitting group and a second direct-type light-emitting group. The side-type light-emitting unit includes a plurality of side-type light-emitting elements for surrounding the direct-type light-emitting unit. The first direct-type light-emitting group includes a plurality of first direct-type light-emitting elements, and the second direct-type light-emitting group includes a plurality of second direct-type light-emitting elements for surrounding the first direct-type light-emitting group.

In yet another aspect, the present disclosure provides an image display comprising a display module and a backlight module disposed under the display module. The backlight module includes a direct-type light-emitting unit and a side-type light-emitting unit. The direct-type light-emitting unit includes a first direct-type light-emitting group and a second direct-type light-emitting group. The side-type light-emitting unit includes a plurality of side-type light-emitting elements for surrounding the direct-type light-emitting unit. The first direct-type light-emitting group includes a plurality of first direct-type light-emitting elements, and the second direct-type light-emitting group includes a plurality of second direct-type light-emitting elements for surrounding the first direct-type light-emitting group.

Therefore, by virtue of "the first direct-type light-emitting group including a plurality of first direct-type light-emitting elements, and the second direct-type light-emitting group includes a plurality of second direct-type light-emitting elements for surrounding the first direct-type light-emitting group" and "the side-type light-emitting unit including a plurality of side-type light-emitting elements for surrounding the direct-type light-emitting unit", all of the direct-type light-emitting elements for generating vertical light beams (such as a direct-type light source) and the side-type light-emitting elements for generating horizontal light beams (such as a side-type light source) can be concurrently applied to the backlight module and the image display.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
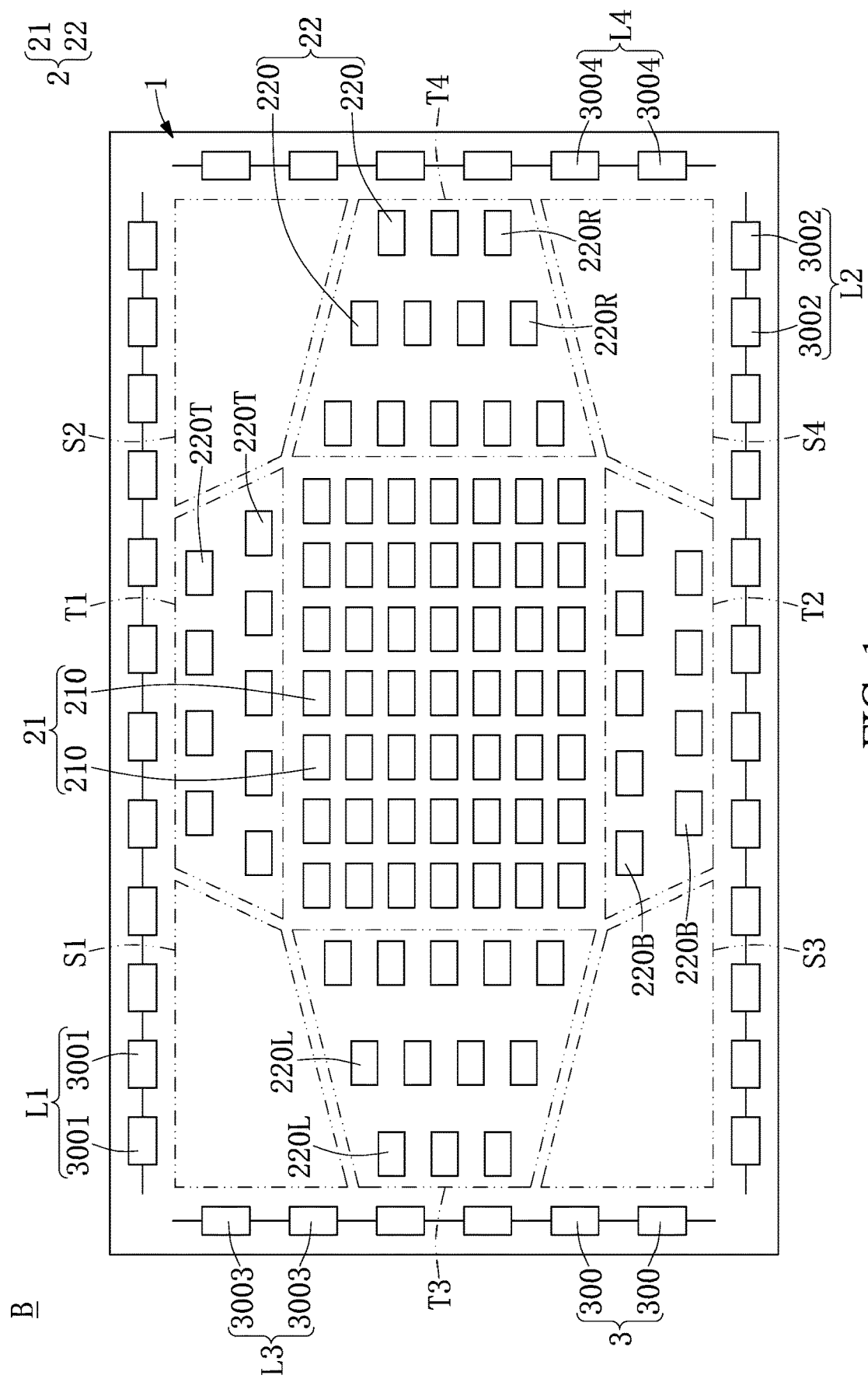
FIG. 1 is a top schematic view of a backlight module according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1, a first embodiment of the present disclosure provides a backlight module B which includes a circuit substrate 1, a direct-type light-emitting unit 2 and a side-type light-emitting unit 3. More particularly, the direct-type light-emitting unit 2 includes a first direct-type light-emitting group 21 disposed on the circuit substrate 1 and a second direct-type light-emitting group 22 disposed on the circuit substrate 1. The first direct-type light-emitting group 21 includes a plurality of first direct-type light-emitting elements 210, and the second direct-type light-emitting group 22 includes a plurality of second direct-type light-emitting elements 220 for surrounding the first direct-type light-emitting group 21. In addition, the side-type light-emitting unit 3 includes a plurality of side-type light-emitting elements 300 disposed on the circuit substrate 1 for surrounding the direct-type light-emitting unit 2. Therefore, all of the first direct-type light-emitting elements 210 and the second direct-type light-emitting elements 220 for generating vertical light beams (such as a direct-type light source) and the side-type light-emitting elements 300 for generating horizontal light beams (such as a side-type light source) can be concurrently applied to the backlight module B, so that the contrast and the uniformity of the light sources generated by the backlight module B can be increased.

For example, as shown in FIG. 1, the first direct-type light-emitting elements 210 can be arranged in a n×m matrix, in which "n" and "m" are positive integers, and "n" may be larger than, equal to or smaller than "m". In addition, the first direct-type light-emitting elements 210 can be arranged as a square, a rectangle or any shape, and the first direct-type light-emitting elements 210 can be densely arranged as a predetermined shape on a central region of the circuit substrate 1. However, the aforementioned description is merely an example and is not meant to limit the scope of the present disclosure.

For example, as shown in FIG. 1, the second direct-type light-emitting elements 220 can be divided (or classified) into a plurality of top side light-emitting elements 220T, a plurality of bottom side light-emitting elements 220B, a plurality of left side light-emitting elements 220L and a plurality of right side light-emitting elements 220R. In addition, the side-type light-emitting elements 300 can be divided (or classified) into a plurality of first side-type light-emitting elements 3001 used as a first side-type light bar L1, a plurality of second side-type light-emitting elements 3002 used as a second side-type light bar L2, a plurality of third side-type light-emitting elements 3003 used as a third side-type light bar L3, and a plurality of fourth side-type light-emitting elements 3004 used as a fourth side-type light bar L4. However, the aforementioned description is merely an example and is not meant to limit the scope of the present disclosure.

For example, as shown in FIG. 1, the top side light-emitting elements 220T can be disposed between the first direct-type light-emitting group 21 and the first side-type light bar L1, the bottom side light-emitting elements 220B can be disposed between the first direct-type light-emitting group 21 and the second side-type light bar L2, the left side light-emitting elements 220L can be disposed between the first direct-type light-emitting group 21 and the third side-type light bar L3, and the right side light-emitting elements 220R can be disposed between the first direct-type light-emitting group 21 and the fourth side-type light bar L4. It should be noted that the top side light-emitting elements 220T can be arranged as a first isosceles trapezoid T1 (or non-isosceles trapezoid) gradually receding along a direction from the first direct-type light-emitting group 21 toward the first side-type light bar L1, the bottom side light-emitting elements 220B can be arranged as a second isosceles trapezoid T2 (or non-isosceles trapezoid) gradually receding along a direction from the first direct-type light-emitting group 21 toward the second side-type light bar L2, the left side light-emitting elements 220L can be arranged as a third isosceles trapezoid T3 (or non-isosceles trapezoid) gradually receding along a direction from the first direct-type light-emitting group 21 toward the third side-type light bar L3, and the right side light-emitting elements 220R can be arranged as a fourth isosceles trapezoid T4 (or non-isosceles trapezoid) gradually receding along a direction from the first direct-type light-emitting group 21 toward the fourth side-type light bar L4. However, the aforementioned description is merely an example and is not meant to limit the scope of the present disclosure.

For example, as shown in FIG. 1, a first unoccupied region S1 is formed between the first side-type light bar L1, the third side-type light bar L3 and the direct-type light-emitting unit 2, a second unoccupied region S2 is formed between the first side-type light bar L1, the fourth side-type light bar L4 and the direct-type light-emitting unit 2, a third unoccupied region S3 is formed between the second side-type light bar L2, the third side-type light bar L3 and the direct-type light-emitting unit 2, and a fourth unoccupied region S4 is formed between the second side-type light bar L2, the fourth side-type light bar L4 and the direct-type light-emitting unit 2. In other words, the first direct-type light-emitting elements 210, the second direct-type light-emitting elements 220 and the side-type light-emitting elements 300 can be arranged on a predetermined region except for the first unoccupied region S1, the first unoccupied region S1, the first unoccupied region S1 and the first unoccupied region S1. It should be noted that the array density of the first direct-type light-emitting elements 210 can be larger than the array density of the second direct-type light-emitting elements 220, the array density of the top side light-emitting elements 220T can be substantially or exactly equal to the array density of the bottom side light-emitting elements 220B, the array density of the left side light-emitting elements 220L can be substantially or exactly equal to the array density of the right side light-emitting elements 220R, and the array density of the top side light-emitting elements 220T can be larger than the array density of the left side light-emitting elements 220L. However, the aforementioned description is merely an example and is not meant to limit the scope of the present disclosure.

Second Embodiment

Figure 2:
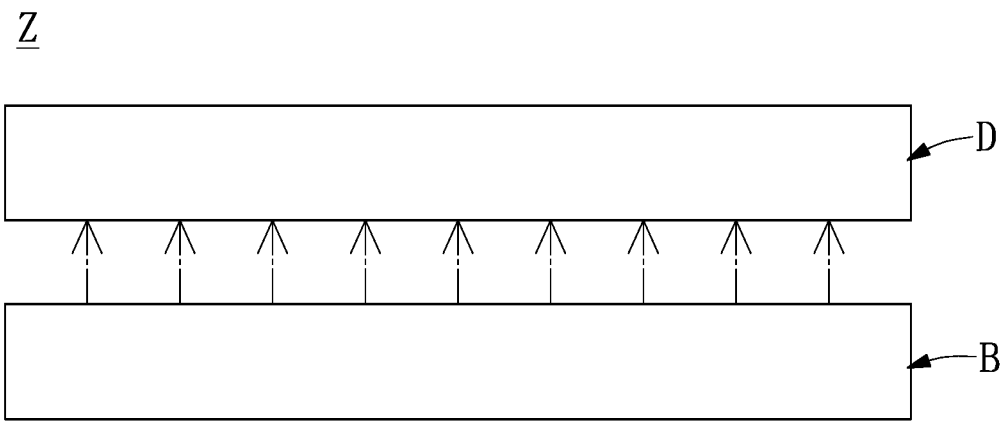
FIG. 2 is a lateral schematic view of an image display according to a second embodiment of the present disclosure.

Referring to FIG. 2, a second embodiment of the present disclosure provides an image display Z including a display module D and a backlight module B disposed under the display module D, and the backlight module B can provide a predetermined light source for the display module D. For example, the display module D may be an LCD, such as a TN (twisted nematic) LCD, a STN (super twisted nematic) LCD, or a TFT LCD. However, the aforementioned description is merely an example and is not meant to limit the scope of the present disclosure.

More particularly, as shown in FIG. 1, the backlight module B includes a circuit substrate 1, a direct-type light-emitting unit 2 and a side-type light-emitting unit 3. Furthermore, the direct-type light-emitting unit 2 includes a first direct-type light-emitting group 21 disposed on the circuit substrate 1 and a second direct-type light-emitting group 22 disposed on the circuit substrate 1. The first direct-type light-emitting group 21 includes a plurality of first direct-type light-emitting elements 210, and the second direct-type light-emitting group 22 includes a plurality of second direct-type light-emitting elements 220 for surrounding the first direct-type light-emitting group 21. In addition, the side-type light-emitting unit 3 includes a plurality of side-type light-emitting elements 300 disposed on the circuit substrate 1 for surrounding the direct-type light-emitting unit 2. Therefore, all of the first direct-type light-emitting elements 210 and the second direct-type light-emitting elements 220 for generating vertical light beams (such as a direct-type light source) and the side-type light-emitting elements 300 for generating horizontal light beams (such as a side-type light source) can be concurrently applied to the backlight module B, so that the contrast and the uniformity of the light sources generated by the backlight module B can be increased.

In conclusion, by virtue of "the first direct-type light-emitting group 21 including a plurality of first direct-type light-emitting elements 210, and the second direct-type light-emitting group 22 includes a plurality of second direct-type light-emitting elements 220 for surrounding the first direct-type light-emitting group 21" and "the side-type light-emitting unit 3 including a plurality of side-type light-emitting elements 300 for surrounding the direct-type light-emitting unit 2", all of the first direct-type light-emitting elements 210 and the second direct-type light-emitting elements 220 for generating vertical light beams (such as a direct-type light source) and the side-type light-emitting elements 300 for generating horizontal light beams (such as a side-type light source) can be concurrently applied to the backlight module B and the image display Z.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:
1. A backlight module, comprising:
a circuit substrate;
a direct-type light-emitting unit including a first direct-type light-emitting group disposed on the circuit substrate and a second direct-type light-emitting group disposed on the circuit substrate; and
a side-type light-emitting unit including a plurality of side-type light-emitting elements disposed on the circuit substrate for surrounding the direct-type light-emitting unit;
wherein the first direct-type light-emitting group includes a plurality of first direct-type light-emitting elements arranged as a matrix, and the second direct-type light-emitting group includes a plurality of second direct-type light-emitting elements for surrounding the first direct-type light-emitting group.

2. The backlight module according to claim 1, wherein the first direct-type light-emitting elements are arranged in a n×m matrix, in which n and m are positive integers, and n is larger than, equal to or smaller than m; wherein the second direct-type light-emitting elements are divided into a plurality of top side light-emitting elements, a plurality of bottom side light-emitting elements, a plurality of left side light-emitting elements and a plurality of right side light-emitting elements, and the side-type light-emitting elements are divided into a plurality of first side-type light-emitting elements used as a first side-type light bar, a plurality of second side-type light-emitting elements used as a second side-type light bar, a plurality of third side-type light-emitting elements used as a third side-type light bar, and a plurality of fourth side-type light-emitting elements used as a fourth side-type light bar; wherein the top side light-emitting elements are disposed between the first direct-type light-emitting group and the first side-type light bar, the bottom side light-emitting elements are disposed between the first direct-type light-emitting group and the second side-type light bar, the left side light-emitting elements are disposed between the first direct-type light-emitting group and the third side-type light bar, and the right side light-emitting elements are disposed between the first direct-type light-emitting group and the fourth side-type light bar.

3. The backlight module according to claim 2, wherein the top side light-emitting elements are arranged as a first isosceles trapezoid gradually receding along a direction from the first direct-type light-emitting group toward the first side-type light bar, the bottom side light-emitting elements are arranged as a second isosceles trapezoid gradually receding along a direction from the first direct-type light-emitting group toward the second side-type light bar, the left side light-emitting elements are arranged as a third isosceles trapezoid gradually receding along a direction from the first direct-type light-emitting group toward the third side-type light bar, and the right side light-emitting elements are arranged as a fourth isosceles trapezoid gradually receding along a direction from the first direct-type light-emitting group toward the fourth side-type light bar; wherein a first unoccupied region is formed between the first side-type light bar, the third side-type light bar and the direct-type light-emitting unit, a second unoccupied region is formed between the first side-type light bar, the fourth side-type light bar and the direct-type light-emitting unit, a third unoccupied region is formed between the second side-type light bar, the third side-type light bar and the direct-type light-emitting unit, and a fourth unoccupied region is formed between the second side-type light bar, the fourth side-type light bar and the direct-type light-emitting unit; wherein an array density of the first direct-type light-emitting elements is larger than an array density of the second direct-type light-emitting elements, an array density of the top side light-emitting elements is equal to an array density of the bottom side light-emitting elements, an array density of the left side light-emitting elements is equal to an array density of the right side light-emitting elements, and the array density of the top side light-emitting elements is larger than the array density of the left side light-emitting elements.

4. A backlight module, comprising:
a direct-type light-emitting unit including a first direct-type light-emitting group and a second direct-type light-emitting group; and
a side-type light-emitting unit including a plurality of side-type light-emitting elements for surrounding the direct-type light-emitting unit;
wherein the first direct-type light-emitting group includes a plurality of first direct-type light-emitting elements, and the second direct-type light-emitting group includes a plurality of second direct-type light-emitting elements for surrounding the first direct-type light-emitting group.

5. The backlight module according to claim 4, wherein the first direct-type light-emitting elements are arranged in a n×m matrix, in which n and m are positive integers, and n is larger than, equal to or smaller than m; wherein the second direct-type light-emitting elements are divided into a plurality of top side light-emitting elements, a plurality of bottom side light-emitting elements, a plurality of left side light-emitting elements and a plurality of right side light-emitting elements, and the side-type light-emitting elements are divided into a plurality of first side-type light-emitting elements used as a first side-type light bar, a plurality of second side-type light-emitting elements used as a second side-type light bar, a plurality of third side-type light-emitting elements used as a third side-type light bar, and a plurality of fourth side-type light-emitting elements used as a fourth side-type light bar; wherein the top side light-emitting elements are disposed between the first direct-type light-emitting group and the first side-type light bar, the bottom side light-emitting elements are disposed between the first direct-type light-emitting group and the second side-type light bar, the left side light-emitting elements are disposed between the first direct-type light-emitting group and the third side-type light bar, and the right side light-emitting elements are disposed between the first direct-type light-emitting group and the fourth side-type light bar.

6. The backlight module according to claim 5, wherein the top side light-emitting elements are arranged as a first isosceles trapezoid gradually receding along a direction from the first direct-type light-emitting group toward the first side-type light bar, the bottom side light-emitting elements are arranged as a second isosceles trapezoid gradually receding along a direction from the first direct-type light-emitting group toward the second side-type light bar, the left side light-emitting elements are arranged as a third isosceles trapezoid gradually receding along a direction from the first direct-type light-emitting group toward the third side-type light bar, and the right side light-emitting elements are arranged as a fourth isosceles trapezoid gradually receding along a direction from the first direct-type light-emitting group toward the fourth side-type light bar; wherein a first unoccupied region is formed between the first side-type light bar, the third side-type light bar and the direct-type light-emitting unit, a second unoccupied region is formed between the first side-type light bar, the fourth side-type light bar and the direct-type light-emitting unit, a third unoccupied region is formed between the second side-type light bar, the third side-type light bar and the direct-type light-emitting unit, and a fourth unoccupied region is formed between the second side-type light bar, the fourth side-type light bar and the direct-type light-emitting unit; wherein an array density of the first direct-type light-emitting elements is larger than an array density of the second direct-type light-emitting elements, an array density of the top side light-emitting elements is equal to an array density of the bottom side light-emitting elements, an array density of the left side light-emitting elements is equal to an array density of the right side light-emitting elements, and the array density of the top side light-emitting elements is larger than the array density of the left side light-emitting elements.

7. An image display comprising a display module and a backlight module disposed under the display module, wherein the backlight module comprises:
a direct-type light-emitting unit including a first direct-type light-emitting group and a second direct-type light-emitting group; and
a side-type light-emitting unit including a plurality of side-type light-emitting elements for surrounding the direct-type light-emitting unit;
wherein the first direct-type light-emitting group includes a plurality of first direct-type light-emitting elements, and the second direct-type light-emitting group includes a plurality of second direct-type light-emitting elements for surrounding the first direct-type light-emitting group.

8. The image display according to claim 7, wherein the first direct-type light-emitting elements are arranged in a n×m matrix, in which n and m are positive integers, and n is larger than, equal to or smaller than m; wherein the second direct-type light-emitting elements are divided into a plurality of top side light-emitting elements, a plurality of bottom side light-emitting elements, a plurality of left side light-emitting elements and a plurality of right side light-emitting elements, and the side-type light-emitting elements are divided into a plurality of first side-type light-emitting elements used as a first side-type light bar, a plurality of second side-type light-emitting elements used as a second side-type light bar, a plurality of third side-type light-emitting elements used as a third side-type light bar, and a plurality of fourth side-type light-emitting elements used as a fourth side-type light bar; wherein the top side light-emitting elements are disposed between the first direct-type light-emitting group and the first side-type light bar, the bottom side light-emitting elements are disposed between the first direct-type light-emitting group and the second side-type light bar, the left side light-emitting elements are disposed between the first direct-type light-emitting group and the third side-type light bar, and the right side light-emitting elements are disposed between the first direct-type light-emitting group and the fourth side-type light bar.

9. The image display according to claim 8, wherein the top side light-emitting elements are arranged as a first isosceles trapezoid gradually receding along a direction from the first direct-type light-emitting group toward the first side-type light bar, the bottom side light-emitting elements are arranged as a second isosceles trapezoid gradually receding along a direction from the first direct-type light-emitting group toward the second side-type light bar, the left side light-emitting elements are arranged as a third isosceles trapezoid gradually receding along a direction from the first direct-type light-emitting group toward the third side-type light bar, and the right side light-emitting elements are arranged as a fourth isosceles trapezoid gradually receding along a direction from the first direct-type light-emitting group toward the fourth side-type light bar; wherein a first unoccupied region is formed between the first side-type light bar, the third side-type light bar and the direct-type light-emitting unit, a second unoccupied region is formed between the first side-type light bar, the fourth side-type light bar and the direct-type light-emitting unit, a third unoccupied region is formed between the second side-type light bar, the third side-type light bar and the direct-type light-emitting unit, and a fourth unoccupied region is formed between the second side-type light bar, the fourth side-type light bar and the direct-type light-emitting unit.

10. The image display according to claim 9, wherein an array density of the first direct-type light-emitting elements is larger than an array density of the second direct-type light-emitting elements, an array density of the top side light-emitting elements is equal to an array density of the bottom side light-emitting elements, an array density of the left side light-emitting elements is equal to an array density of the right side light-emitting elements, and the array density of the top side light-emitting elements is larger than the array density of the left side light-emitting elements.

* * * * *